(12) United States Patent
Thompson

(10) Patent No.: US 9,473,629 B2
(45) Date of Patent: Oct. 18, 2016

(54) COMMUNICATION DELIVERY FILTER FOR MOBILE DEVICE

(71) Applicant: Raphael A Thompson, Sharpsburg, GA (US)

(72) Inventor: Raphael A Thompson, Sharpsburg, GA (US)

(*) Notice: Subject to any disclaimer, the term of this patent is extended or adjusted under 35 U.S.C. 154(b) by 0 days.

(21) Appl. No.: 14/456,295

(22) Filed: Aug. 11, 2014

(65) Prior Publication Data

US 2014/0349636 A1    Nov. 27, 2014

Related U.S. Application Data

(63) Continuation of application No. 12/106,320, filed on Apr. 20, 2008, now Pat. No. 8,868,053.

(60) Provisional application No. 60/913,263, filed on Apr. 20, 2007.

(51) Int. Cl.
*H04M 3/00* (2006.01)
*H04M 3/436* (2006.01)
*H04M 3/42* (2006.01)

(52) U.S. Cl.
CPC ......... *H04M 3/436* (2013.01); *H04M 3/42153* (2013.01); *H04M 2203/2072* (2013.01)

(58) Field of Classification Search
CPC ................ H04M 2203/2072; H04M 3/42153; H04M 3/436; H04M 1/663; H04M 3/533; H04M 1/64

USPC ......................................................... 455/418
See application file for complete search history.

(56) References Cited

U.S. PATENT DOCUMENTS

| | | | |
|---|---|---|---|
| 2001/0051534 A1* | 12/2001 | Amin ..................... | H04M 1/663 455/565 |
| 2004/0052360 A1* | 3/2004 | Tsai ...................... | H04M 1/663 379/392.01 |
| 2004/0229600 A1* | 11/2004 | Saez ..................... | H04M 3/436 455/417 |
| 2005/0232229 A1* | 10/2005 | Miyamoto ........ | H04L 29/06027 370/351 |

* cited by examiner

*Primary Examiner* — Timothy Pham
(74) *Attorney, Agent, or Firm* — Smith Tempel Blaha LLC; Gregory S Smith

(57) ABSTRACT

Messages received by a mobile device can be processed in one of at least two modes. In the normal mode, the messages are handled in accordance with the normal settings of the mobile device. In the filtered mode, or "night-time" mode, incoming messages are examined to determine if they are to be filtered or if they are exempt from filtering. If a message is exempt from filtering, it is processed in accordance with the normal mode. However, if the message is to be filtered, the mobile device is prevented from providing normal message reception alert notifications. Messages can be identified as being exempt to being filtered by editing an address book or selecting entries from an address book. All messages not identified as exempt then get filtered.

19 Claims, 1 Drawing Sheet

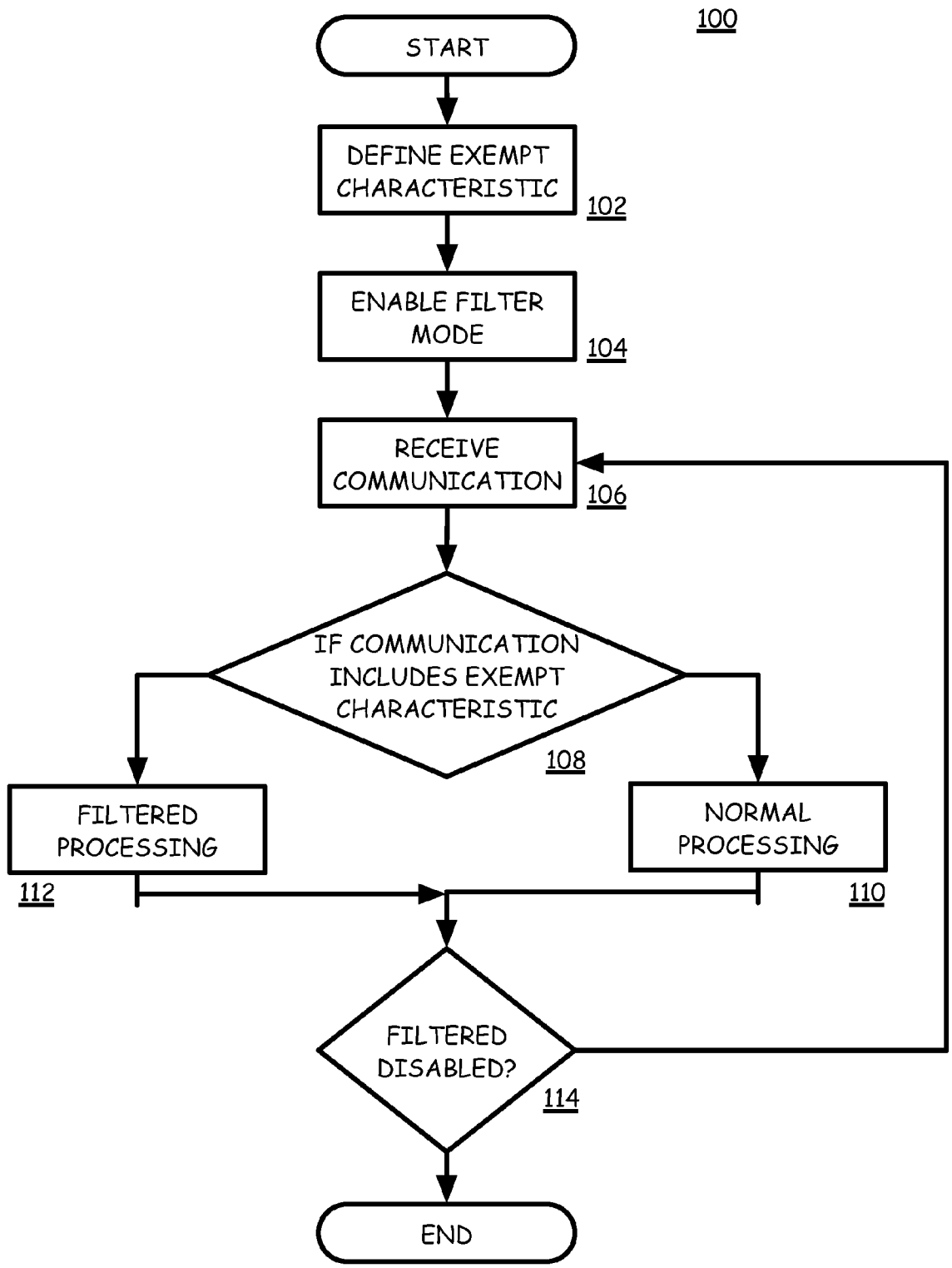

COMMUNICATION DELIVERY FILTER FOR MOBILE DEVICE

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, claiming the benefit of the prior filing date of U.S. patent Ser. No. 12/106,320, which application claims the benefit under Title 35, U.S.C. §119(e) of the United States provisional application for patent that was filed on Apr. 20, 2007 and assigned Ser. No. 60/913,263, each of which are incorporated herein by reference in their entirety.

BACKGROUND OF THE INVENTION

Changes in the cellular industry have led to widespread, daily, and around-the-clock use of cell phones.

Initially, cellular phones were large, cumbersome, heavy, and expensive, with spotty reception and expensive airtime. By contrast, cell phones of today are small and light-in weight, with initial costs subsided by competing service providers. Today's cell phone plans have much better coverage and inexpensive airtime packages. New features have also dramatically fueled the huge increase in the number of phones and their constant around-the-clock use; with many phones never leaving their owner's side.

Most new phones have various new features, including text messaging, internal cameras providing the ability to send and receive pictures and video, web browsing, configurable ring tones, and MP3 players with music downloads. Cell phones with accurate date and time information (which automatically updates in new time zones) allow users to set the built-in alarm clocks to awaken to their choice of music the next morning.

Unfortunately, cell phones do not differ in day and night operation. Phones at night can receive text messages, pictures, wrong number calls, solicitation calls, or calls from inconsiderate friends who have lost track of time. Time zone changes can also make an otherwise normal 9:00 pm West Coast call awaken a user on the East Coast at midnight. Today, many cell phone users leave their cell phones on throughout the night, so as not to miss important calls. This unfortunately leaves the user open to being disturbed or awaken by calls or messages received during the nighttime that are not important.

Therefore, there has become a need for a method for a selectable Nighttime Mode that would stop notification of all incoming calls and messages, with the exception of those from a contact that have been predetermined as important (or Nighttime Mode exempt). The present invention process provides a unique, smart, and novel solution to the problem discussed.

BRIEF SUMMARY OF THE DISCLOSURE

The object of the invention is a method for a Nighttime Mode for cellular phones. Nighttime Mode will allow users a way to use their phones during nighttime hours without receiving unwanted calls or messages (text, pictures, voicemail, or other incoming data). The default for the Nighttime Mode is to stop all incoming phone modes. The Nighttime Mode will be fully customizable. Customization will allow cell phone owners to choose pre-determined important contacts to be exempt from Nighttime Mode. During the Nighttime Mode, the phone will operate normally only for those selected Nighttime Mode exempt phone numbers. This will allow a cell phone to receive calls, text, or other incoming modes of communication only from numbers deemed to be important. For example, a user may wish to only receive a spouse's cell phone call during the Nighttime Mode. The user can select his/her number from the address book to be Nighttime Mode exempt. During the following night, when the Nighttime Mode turned on, the phone will only operate normally for the spouse's call; for all other callers, the phone remains silent. A cell phone user may select any number of contacts to be Nighttime Mode exempt.

Nighttime Mode can be turned on manually or automatically and will stay in effect until turned off either manually or automatically. A Nighttime Nap mode will provide the same function as the Nighttime mode but in short selectable durations.

One embodiment of the present invention includes a module or process that can operate within a mobile device and provide a filter of particular messages directed for delivery to a mobile device. Initially, the embodiment operates to identify at least one exempt message characteristic, such as a telephone number. The filtering mode can then be activated or enabled. When a communication is received, the communication is examined to determine if it contains the exempt message characteristic. If the message contains the exempt message characteristic, normal process is applied to the message. Otherwise, the message is filtered.

Another embodiment of the invention may include a user interface for entering telephone numbers as exempt message characteristics. Another embodiment may include the storage of a of telephone numbers and the process of identifying at least one exempt message characteristic includes selecting one or more telephone numbers from the plurality of telephone numbers. Thus, the selected telephone numbers being exempt message characteristics.

Embodiments of the invention may include an internal clock. In such embodiments, enabling the filter may include setting a start time at which the filter becomes active. Further, such an embodiment may also include the ability to set duration, such as be setting a time value or a stop time at which the filter becomes inactive.

Alternatively or in addition to, embodiments may include an alarm set-up interface and the filter can be enabled by receiving an alarm set on the alarm set-up interface, prompting a user to enable the filter, receiving a positive selection from the user, and enabling the filter mode in response to the positive selection. In addition, the filter can be disabled after an alarm occurs in accordance with the alarm set. Alternatively, the filter can be disabled a short delay after the alarm occurs in accordance with the alarm set; and disabling of the filter can be delayed if a snooze button or feature is actuated during the short delay.

As a specific example, if the message is a voice call then the action of filtering the message (i.e., if the exempt message characteristic is absent) may include instantly sending the message to voice mail. In addition, the action may include inhibiting the sounding of a message alert.

BRIEF DESCRIPTION OF THE SEVERAL VIEWS OF THE DRAWING

FIG. 1 is a flow diagram illustrating the steps involved in one embodiment of the present invention.

DETAILED DESCRIPTION OF THE DISCLOSURE

The Nighttime mode is a completely new process for cellular phones, which provides a unique, smart and novel solution to the problem discussed earlier.

The selectable Nighttime mode will default to prohibit notification of all incoming calls and all types of messages, while the Nighttime mode is on. This mode will allow users to keep their phones on, but not be disturbed by incoming calls or messages. During Nighttime mode the cellular phone will remain silent and the screen will also remain dark when receiving any type of incoming calls and messages. Incoming callers will get the phones voicemail instantly as if the phone was actually off. Some phone models depending on the manufacture may have a selectable separate voice mail message to inform the caller the phone is in Nighttime mode and to leave a message. Other forms of messages (including text, picture, video) will be received by the phone but not announced during the Nighttime mode. Incoming message count during the Nighttime mode can be viewed on the screen but the phone will remain silent and dark (LCD screen will not be back lit). The Phone's screen will also have "Nighttime" or "Night" announced across the screen to remind the user the phone is in Nighttime mode. Once the Nighttime mode is turned off, the cell phone will revert to normal operation. Notification of any calls, voicemail, or messages received during the Nighttime mode will be announced by the phones normal means of notification to the user.

Although the Nighttime mode will default to prohibit notification of all incoming calls and all types of messages, the Nighttime mode will be fully customizable. Customization will allow cell phone owners to choose pre-determined important numbers to be exempt from the Nighttime mode 102. This will allow a cell phone to receive calls, text, or other incoming modes of communication 106 to be received only from numbers deemed to be important (Nighttime mode exempt) 108 and 110 while the Nighttime mode is on. Phone numbers may be pre-selected from the users address book to be Nighttime mode exempt 102. Some manufactures may select an alternate way of selecting Nighttime mode exempt phone numbers such as a separate menu where the numbers are entered. During the nighttime mode the phone will operate normally only for those selected Nighttime mode exempt phone numbers 110. For example, you may wish to only receive your spouse's cell phone call during the Nighttime mode. You select his/her number from the address book to be Nighttime mode exempt. During the following night with the Nighttime mode turned on, your phone will only operate normal for your spouse's call and for all other callers the phone remains silent 112. A cell phone user may select as many or as few numbers to be Nighttime mode exempt.

The Nighttime mode may be enabled in one of three ways 104. The first way discussed is by using the phone's internal clock. The second way is by the phone's internal alarm clock, and the last way discussed is by using the short Nighttime mode referred to as Nighttime Nap mode.

The first way to turn on the Nighttime Mode is with the help of the cell phones internal clock. The cell phone user selects a start and stop time for the Nighttime mode to be automatically turned on and off (using the phones internal clock). For example: A cell phone user goes to bed at 10:30 pm and get up at 6:30 am. The user then sets the Nighttime mode to turn on at 10:30 104 and turn off at 6:30 AM 114. From this same setup page the frequency of use of nighttime mode can also be set to: once, daily, mon-fri, or weekends. This setup page will vary from phone model to phone model depending on different phone manufactures and button placement, but the user will be able to select the start, and stop time and the frequency for the Nighttime mode.

Another way of starting the nighttime mode is when the phone's internal alarm is set. When the user sets the alarm (normally at bed time) to wake up the alarm set up page will prompt the user for nighttime mode to be started. If the user selects yes, then the Nighttime mode will be started instantly. Nighttime mode will stay in effect until 30 seconds after the alarm goes off. This delay will give a drowsy phone user time to use the alarm's snooze function without receiving notification of waiting messages. If the snooze is reselected, the Nighttime mode will continue until 30 seconds after the snooze alarm goes off, or the alarm is turned off. Once the alarm is turned off, the phone will provide notification of waiting messages via the phones normal notification process.

The last way to turn on the Nighttime mode is with a Nighttime Nap mode button. This Nighttime Nap mode functions the same way as the normal Nighttime mode with the exception of duration. Nighttime Nap mode will be selected in intervals of 15 minutes. The Nighttime Nap mode will be turned on instantly by selecting a Nighttime Nap button if available from the phone's manufacturer. If not, a normal menu will allow for quickly selecting a Nighttime Nap mode with intervals of 15 minutes. This feature will allow a user to have the benefits of Nighttime mode instantly, to take a nap without being disturbed by their phone. This feature can be selected for example by pushing the Nap mode button once for 15 min, twice for thirty minutes, three times for forty five minutes and so on. While the Nap mode is handy for an afternoon nap, the feature may be useful at other times when a cell phone's use should be limited to important calls only. For example, the nap mode may be useful at an important lunch meeting with clients when you may only want to be interrupted for important calls. Push the nap button four times, and instantly your phone turns on the Nighttime Nap mode, and you have an hour of undisturbed lunch, but you are still available for important calls. During the Nighttime Nap mode the phone's screen will also have "Nighttime Nap" or "Nap" announced across the screen to remind the user the phone is in Nighttime Nap mode. The phone will also display a countdown timer of how much time is left for the Nighttime Nap mode. The phone will remain in Nighttime nap mode until the selected amount of time runs out, or the nap mode is cancelled by the user. Then the phone will revert to normal operation.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is being claimed is:

1. A method implemented within a mobile device for inhibiting at least one type of notification normally provided in response to the reception of a communication initiation received at the mobile device, wherein the mobile device includes the storage of identification data of a plurality of potential communication originators, the method comprising the actions of:
  the mobile device receiving an exempt communication characteristic comprising a selection of identification data for a potential communication originator;
  detecting certain user actuations at a user interface of the mobile device requesting the enablement of a communication reception notification inhibitor, the communication reception notification inhibitor being implemented entirely within the mobile device;
  the mobile device enabling the communication reception notification inhibitor;
  while the communication reception notification inhibitor is enabled:
    receiving the initiation of a communication at the mobile device, the initiation of the communication being directed to the mobile device and identifying a communication originator;
    the communication reception notification inhibitor examining the received initiation of the communication to determine if the received initiation of the communication includes the exempt communication characteristic;
    the communication reception notification inhibitor configured to cause the mobile device to apply normal processing of the initiation of the communication if the exempt message characteristic is identified in the received initiation of the communication; and
    the communication reception notification inhibitor configured to cause the mobile to inhibit a communication reception notification that would be presented during normal processing of the received initiation of the communication if the exempt communication characteristic is not identified in the received message;
  detecting certain user actuations at a user interface of the mobile device requesting the disablement of the communication reception notification inhibitor;
  the mobile device disabling the communication reception notification inhibitor; and
  while the communication reception notification inhibitor is disabled:
    receiving the initiation of a communication at the mobile device, the initiation of the communication being directed to the mobile device; and
    the mobile device applying normal processing of the initiation of the communication.

2. The method of claim 1, wherein the mobile device includes an internal clock and,
  the action of detecting certain user actuations at a user interface of the mobile device requesting the enablement of a communication reception notification inhibitor, comprises receiving a start time and a stop time during which the communication reception notification inhibitor is to be enabled;
  the action of the mobile device enabling the communication reception notification inhibitor comprises the mobile device automatically enabling the communication reception notification inhibitor upon an internal clock reaching the start time; and
  the action of the mobile device disabling the communication reception notification inhibitor comprises the mobile device automatically disabling the communication reception notification inhibitor upon the internal clock reaching the stop time.

3. The method of claim 1, wherein the action of inhibiting the communication reception notification for the received initiation of the communication, if the exempt characteristic is absent, comprises the mobile device inhibiting a sounding of a message alert by the mobile device.

4. The method of claim 1, wherein the action of inhibiting the communication reception notification for the received initiation of the communication, if the exempt characteristic is absent, comprises the mobile device inhibiting a rendering of a visual alert by the mobile device.

5. The method of claim 1, wherein the action of inhibiting the communication reception notification for the received initiation of the communication, if the exempt characteristic is absent, comprises the mobile device inhibiting the sounding and visual display of alert by the mobile device.

6. The method of claim 1, wherein the initiation of the communication is a call setup for a voice call.

7. The method of claim 1, wherein the initiation of the communication is the reception of an email.

8. The method of claim 1, wherein the initiation of the communication is the reception of a text message.

9. The method of claim 1, wherein the initiation of the communication is the reception of an electronic message.

10. The method of claim 1, wherein the action of detecting certain user actuations at a user interface of the mobile device requesting the enablement of a communication reception notification inhibitor, comprises receiving a start time and a stop time during which the communication reception notification inhibitor is to be enabled; and
  the mobile device enabling the communication reception notification inhibitor comprises the mobile device automatically enabling the communication reception notification inhibitor upon an internal clock reaching the start time.

11. A mobile device for processing received communications in one of a plurality of modes, the mobile device comprising:
  a module, operating entirely within the mobile device, configured to enable a first mode of operation that, in response to receiving a communication initiation at the mobile device, operates by applying normal processing of the communication initiation such that the mobile device provides a user-indicator of such communication initiation reception and, configured to enable a second mode of operation that, in response to receiving a communication initiation at the mobile device, operates such that the mobile device as a default, inhibits the provision of the user-indicator for the communication initiation unless the communication initiation includes at least one user selectable exempt characteristic;
  a user interface for detecting user interactions and based on the user interactions, interacting with the mobile device to selectively enable operation of the mobile device in the first mode in response to first user interactions and second mode of operation in response to second user interactions and to enable the selection of exempt characteristics, wherein the exempt characteristics comprise the identification of a potential communication originator and is selected from a plurality of originator identifications stored within the mobile device.

12. The mobile device of claim 11, wherein the mobile device is a cellular telephone including an address book with at least one entry in the address book including an exempt characteristic.

13. The mobile device of claim 11, wherein the mobile device is a cellular telephone including a user interface to enable a user to identify potential communication originators stored within the cellular telephone as exempt characteristics.

14. The mobile device of claim 13, wherein the second mode of operation for the mobile device operates to inhibit a communication reception notification for a communication initiation by preventing a user-indicator for a communication initiation reception.

15. A method, operating as a processor implemented module within a mobile telephone to provide selective inhibition of notifications for the reception of communications received at the mobile telephone, the method comprising the actions of:

in response to interactions detected at a user interface of the mobile telephone that identify the selection of an origination identity for a potential originator of a received communication, a process operating entirely within the mobile telephone accesses an address book containing entries, the address book being internal to the mobile telephone, to identify origination identities of one or more potential originators as an exempt origination identities;

in response to receiving information identifying an active time and a duration indicator, the process within the mobile telephone configured to enable a communication reception notification inhibitor at the active time and for the duration;

receiving a communication at the mobile telephone the communication including an origination identity of the communication; and if the communication reception notification inhibitor is enabled:

the process within the mobile telephone examining the communication received at the mobile telephone to determine the origination identity for the received communication;

the process within the mobile telephone bypassing the communication reception notification inhibitor and applying normal processing of the received communication if the origination identity matches one of the exempt origination identities; and the process within the mobile telephone inhibiting the communication reception notification for the received communication but applying normal communication processing if the origination identity does not match one of the exempt message identities by suppressing a communication reception indicator of the mobile telephone; and in response to the duration of time expiring, disabling the communication reception notification inhibitor and, upon the reception of a communication received at the mobile device is processed normally by the process within the mobile telephone applying normal processing and normal notifications of the received communication.

16. The method of claim 15, wherein the communication can be any one of the following message types: electronic messages, text, email, video, and audio and, the step of inhibiting the communication reception notification for the communication further comprises inhibiting the communication notification for each of these message types if received.

17. The method of claim 15, wherein the communication is a voice call.

18. A mobile device that includes a notification screening mode, the mobile device comprising:

a display screen;

a module, executed by a processor within the mobile device and configured to cause the mobile device to:

receive identifying information from a user interface that identifies contacts that are exempt from the notification screening mode;

responsive to receiving a first user input, enter into a notification screening mode for a duration of time and, during the duration of time:

receiving a communication at a communications interface to the mobile device;

examining the content of the communication to determine if the communication is from an exempt contact;

if the communication is from an exempt contact, provide an alert indicator that the communication was received;

if the message is not from an exempt contact, prevent an alert from being provided and otherwise apply normal processing to the communication;

displaying on the display screen an indicator that the mobile device is in the notification screening mode; and after the duration of time, or responsive to receiving a second user input, exiting the notification screening mode and, after exiting the notification screening mode:

receiving a communication at a communications interface to the mobile device; and applying normal alerting and processing of the communication.

19. The mobile device of claim 18, wherein the mobile device includes an internal clock and the module is further configured to receive a start time and a stop time and, wherein the module is configured enter into a notification screening mode for a duration of time in response to the internal clock reaching the start time and to exit the notification screening mode by the internal clock reaching the stop time.

* * * * *